(12) United States Patent
Twiss

(10) Patent No.: X8194
(45) Date of Patent: May 13, 1834

(54) CLOCKS, & TIME PIECES

(76) Inventor: Hiram Twiss

Hiram Iviss of Meriden Connecticut

Letters Patent

The Schedule referred to in these Letters Patent and making part of the
same containing a description in the words of the said Henry Iviss him
self of his improvement in the construction of Clocks and time pieces To... whom it may concern. Be it known that I Hiram Iviss
of Meriden in the County of New Haven and State of Connecticut, have
invented constructed made and applied to use a new and useful improve-
ment in the construction of clocks and time pieces; called Hiram —
Iviss' Patent Clock. and the following Specification includes a partic
ular and minute description thereof. and that the same may be better under
stood. I would premise that the common eight day wooden wheeled mantle
clocks, have a short pendulum, which allows a rapid motion to the pallet
wheel and hence it becomes necessary to multiply the wheels, to reduce the
motion upon the barrel wheel, which unwinds the cord to which the
weight is hung, and this weight can move through a space of only about
thirty six inches in eight days and hence its motion must be slow. Now
with this rapid motion at one end of the series of wheels, and this slow
motion of the barrel wheel which may be taken as the other end of the series,
the intermediate wheels, teeth, and pinions become numerous, produce friction
and require a very heavy weight. In the common eight day mantle clocks,
also in order to allow more motion to the barrel wheel. and so to unroll
more cord, the cord is made fast at one end to the upper part of the clock
case, and thereby half the weight used has no operation on the barrel wheel
From both of these causes a weight of about eleven pounds has here
to fore been used, This makes the clock unwieldly as a portable instru-
ment. increases expense strains the work and renders it liable to get
out of order. In the striking part also similar difficulties have ex
isted and a like heavy weight has been used. My object has been to rem
edy these objections, and to construct an eight day wooden wheeled man
tel clock with light weights hung at the end with single cords and with
a smaller number of wheels. and thus make the article more simple, durable and portable. This I have accomplished by the following means.
I have reduced the motion of the palate wheels and through the time wheels
one half by the use of the balance pendulum, constructed regulated and ap
plied as herein set forth and described. I have reduced the number of
wheels and thereby lessened friction and so am able to drive my clock
by a weight not exceeding five and an half pounds, & probably less hung at
the end of a single cord, and have also so constructed and arranged the striking
part by improvements on the fly so that it can be moved by a weight equal
to that on the time side and hung in the same manner.
My Invention and improvement will be best understood by describing
them in connection with the principal parts of the eight day wooden wheeled
mantle clocks now in use, some of which though not claimed are necessa-
rily altered to adapt them to the improvements which are claimed. The bal
ance pendulum which I introduce consists of a rod or bar about thirteen
inches long armed with a ball of about six ounces weight at each end
and falling by a curve in the bar about half an inch below the line of
axis or centre of motion in which the bar vibrates thereby producing a
repelling motion. This bar is suspended on an axis at its centre about
three inches long at right angles with the bar playing on a Knife edge
at each end, in angular sockets, or which I prefer on points passing
perpendicularly thro' the axis near each end or inserted into the un
der side near the ends and projecting about one eighth of an inch. These
edges or points should be of well tempered steel. The points are to play in a
female centre one sixteenth of an inch deep, one eighth of an inch broad
at the top, and having a flat surface, one thirtieth of an inch in diam
eter at the bottom also well tempered. The ends of the balance pendulum
thus balanced vibrate up and down with the least possible friction.
The bar and axis may be made of wood, of iron or of other suitable metal
and the balls may be made of lead or other metal and ornamented
in front to the fancy of the maker. This balance pendulum is sup-
ported on a stand near the bottom of the clock case containing the
angular sockets above described. From the axis of the balance pendulum
a wire rises perpendicular about three inches long and passing through a loop at the lower end of a pendulum rod: which passes through the crutch wire of the verge thereby allows the time wheels of the clock to move when the balance pendulum vibrates. A spring of rolled wire or other suitable material is also inserted into the axle, and descends perpendicularly about two inches into a regulator which consists of an angular socket of metal resembling the space between two large teeth of a saw inverted. this socket passes through a mortise in a plate of metal to steady it, and is supported on a stud of metal rising from the bottom of the clock case. directly under the axle of the balance and so as to permit the descending spring to touch the cheeks of the socket at each vibration of the balance. The stud on which this socket rests is raised or lowered without stopping the movements of the clock, by a moveable nut attached to the bottom of the clock case through which the stud passes with a screw, and the motion of the balance pendulum is thereby regulated. The vibrations of this balance pendulum are calculated for, and I regulate it so as to give forty five strokes in a minute: whereas the suspended pendulums in common use usually give ninety.

The time wheels are altered to correspond with the slow movement of the balance pendulum as follows. The first time wheel is calculated to move round once in twenty four hours & is armed ~~with~~ forty eight teeth: on this wheel is a barrel one inch in diameter on which the cord attached to the weight winds. This wheel connects with a pinion of eight leaves. on that pinion is the second time wheel having forty eight teeth which connects with a pinion of eight leaves, on which is a third time wheel with forty eight teeth, which connects with another pinion of eight leaves on which is the fourth time wheel, having thirty two teeth which connects with another pinion of eight leaves on which is a pallet wheel with forty five teeth, revolving in front of the front plate The outside pivot of the last mentioned pinion runs in a bridge attached to the front of the front plate. The movement the palate wheel is controlled by a verge connected with the pendulum rod and vibrating on the under side On the center shaft is a wheel armed with twenty four teeth: this wheel is attached & held to the shaft ~~by~~ a spring as usual and connects with a pinion of sixteen leaves on the second time pinion shaft, and thereby moves the centre shaft. On the back end of the centre shaft is a pinion of nine leaves. connected with a wheel of thirty six - In this [illegible] wheel is a pinion of twelve leaves, connected with another wheel of thirty six teeth and in that wheel is the hour hand socket through which the centre shaft passes which carries the minute hand. These wheels and pinions. and other parts not described are supposed to be of the ordinary size and dimensions commonly used in mantle piece clocks, but may be proportionably enlarged or lessened. The number of teeth and leaves are calculated for the motion of a pendulum beating forty five strokes in a minute and is the calculation which I prefer. but the same result may on due calculation be produced by varying the number of teeth in the different wheels and pinions excepting the [illegible] wheels & centre shaft. They may also be varied by proper calculation to suit the vibration of any pendulum, longer or shorter or moving slower or faster. With these alterations in the time wheels my improved clock will move with much less friction. and with the weights on a single cord. not exceeding and probably less than half the required weight on a double cord now used in eight day clocks. The improved balance pendulum as above described is also less liable to the effects of heat and cold than the suspended pendulum in common use: in as much as the expansion and contraction of this pendulum is counteracted by the corresponding contraction or expansion of the regulator My improvement in the striking part is as follows. The first strike wheel so called is made to revolve once in twenty four Hours. and is armed with forty eight teeth. in it is a barrel one inch in diameter on which the cord attached to the weight winds. This wheel connects with a pinion of eight leaves. on that pinion is a second wheel which revolves six times in twenty four hours. On the face of this wheel are twenty six cam wires placed at equal distances which raise the hammer that strikes the bell. Playing into these cams. is a verge the shaft of which is directly over the shafts of the first and second strike wheels. This verge moves in a manner similar to that on the time side, and controls the movements of the striking parts by the following new and improved machinery. On the end of this verge shaft in front of the front plate is a lever firmly fixed about five inches long extending diagonally from the verge shaft to the time side on the end of the lever is a rack or a section of a cog wheel which connects with a pinion of eight leaves running from a pivot in the back plate through a hole in the front plate, and there supported by a bridge on the front plate. On this pinion is a third wheel of forty two teeth more or less which connects with another pinion of six leaves on which is a fly.

The machinery when the weight is unlocked produces alternate backward and forward revolutions of the fly while the clock continues striking thereby giving time between the strokes with a little loss of power. On the end of the shaft of the first mentioned pinion is a pinion or wheel of sixteen teeth or leaves, which runs through the front plate and is there supported by a bridge and connects with a count wheel of forty eight teeth which revolves once in twelve hours. The count wheel turns on the arbor of the strike barrel. The lock work of my clock is similar to that of the common clock except where the clock unlocks, that is done by a wire running nearly horizontal from the verge shaft on which is the thread of a screw to receive and hold a ball of lead or other metal to balance the lever. The end of this wire is bent upwards and plays against a wire rising perpendicularly from the count hook shaft on the count wheel. And when the count hook drops into the gain of the count wheel the wire from the count hook shaft drops under the wire from the verge shaft and stops the clock from striking. The shaft which holds the long lift and the warning hook is on the time side above the first time wheel and near the edges of the plates. The alarm is given on the wheel which carries the fly. The size of the wheels and of the pinions and wires above mentioned and of the plates and other parts of this clock are of the size and dimensions generally used in other clocks, except that the verge of the striking part is larger and about one fourth longer than the verge of the time part, and the face of the second strike wheel where the cams are inserted is armed with a rim of brass. to give firmness to the cams.

to the cams. The several parts herein before described will be seen more in-
telligibly by reference to the model and drawings accompanying this Specification.
I do not claim a balance pendulum as such to be my invention; but I
do claim as my invention and improvement, the successful and advantageous
application of the slow motion of the balance pendulum to the movements of
any portable or wooden clock or time piece.
I do also claim as my original invention the regulator, as above speci-
fied whereby the motion of the pendulum is controled by a spring and its ex-
pansion and contraction counteracted. I also claim as my invention and
improvement, the construction of the striking part as above specified, whereby the fly
is made to revolve backward and forward by means of the lever on the verge shaft and
its connection with the fly as above specified, thereby checking and controling the ham-
mer more perfectly and with less loss of power than can be done by a continued rev-
olution of the fly as in common use and [illegible] to requiring less weight and less space for
its descent. The other parts of a clock mentioned and described in the forego-
ing Specification are introduced for illustration, and I do not claim any of
them except the alterations necessarily made to adapt them to the improvements
herein particularly specified as claimed; and for the improvements thus specified
I solicit Letters Patent to secure the benefits according to Law
In testimony that the foregoing is a true and full specification of my improve-
ments I subscribe these presents this twelfth day of Dec^r 1833

Exd Witnesses
[illegible] Simeon Baldwin
Ebenezer Baldwin

Hiram Twiss (2590 words)

(Granted May 13, 1834)